Dec. 8, 1931.　　M. VUKOVICH ET AL　　1,835,731
SALVAGING DEVICE FOR MAIL OR THE LIKE
Filed April 20, 1931　　2 Sheets-Sheet 1
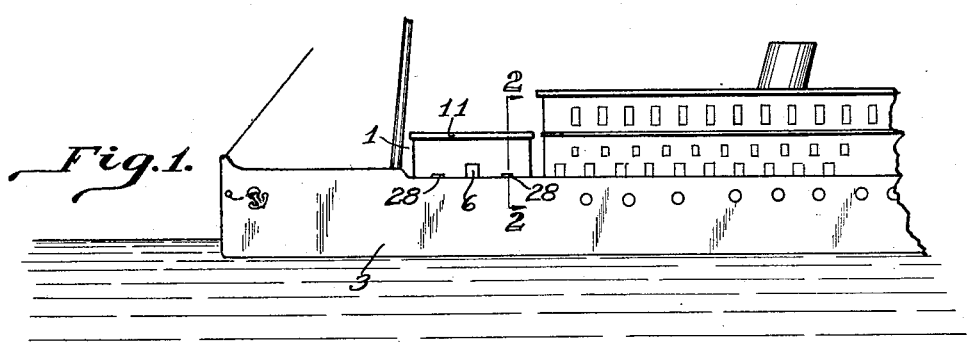
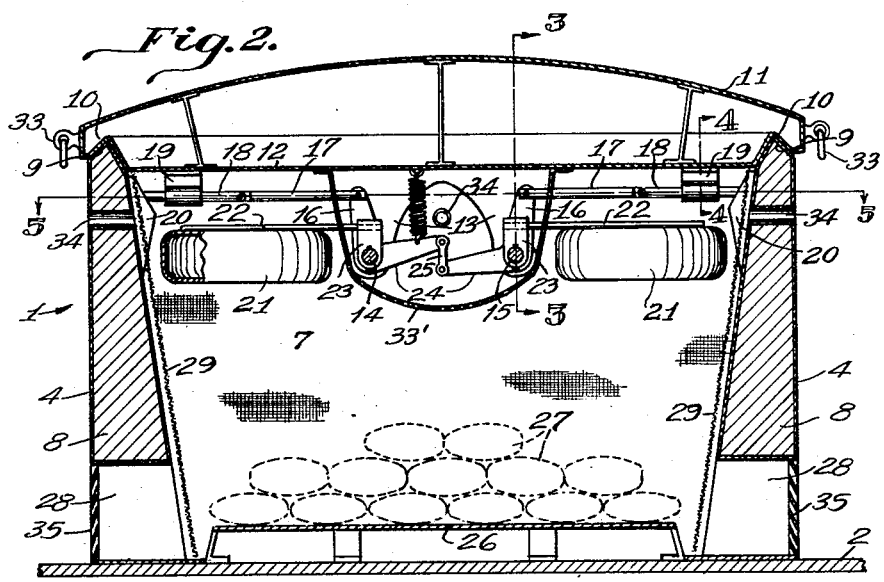
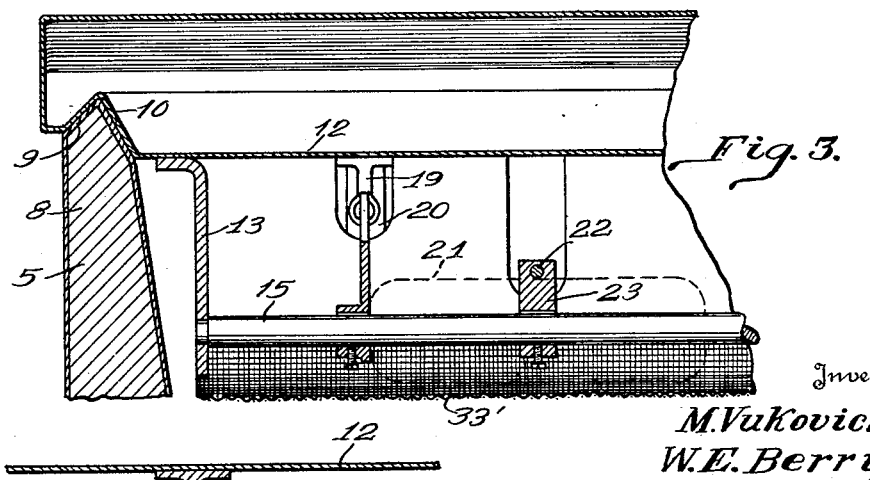
Inventor
M. Vukovich
W. E. Berry
Attorney Dec. 8, 1931.   M. VUKOVICH ET AL   1,835,731
SALVAGING DEVICE FOR MAIL OR THE LIKE
Filed April 20, 1931   2 Sheets-Sheet 2
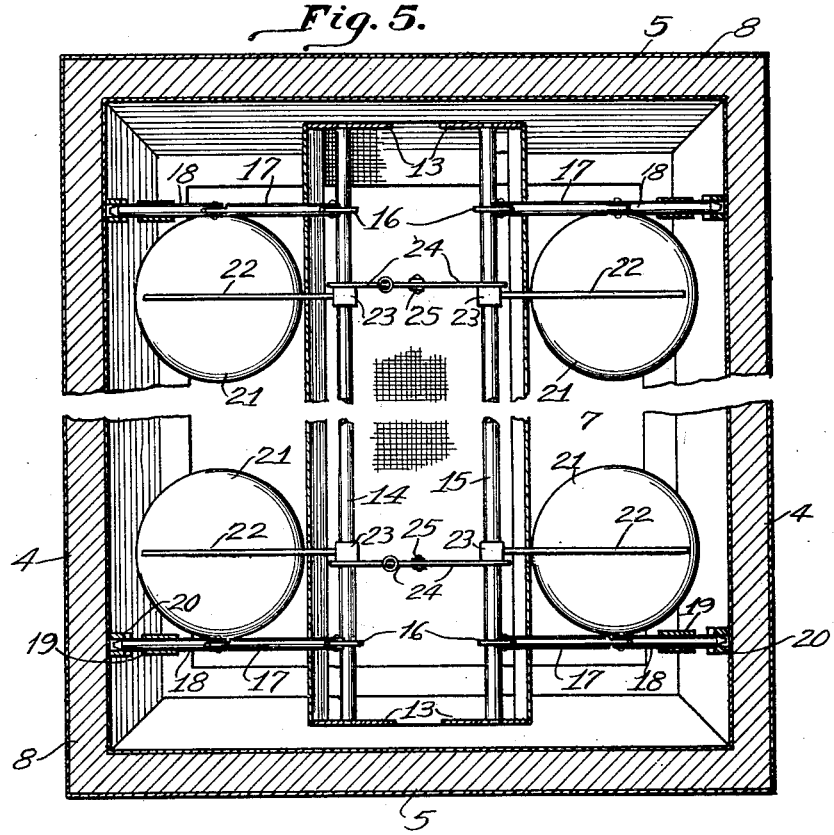
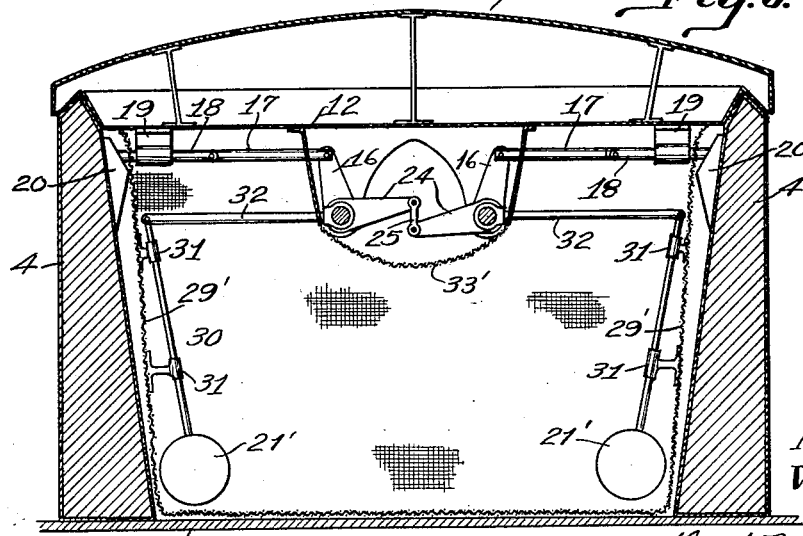
Inventor
M. Vukovich
W. E. Berry
Attorney Patented Dec. 8, 1931

1,835,731

UNITED STATES PATENT OFFICE

MICHAEL VUKOVICH AND WILLIAM E. BERRY, OF COLUMBUS, OHIO

SALVAGING DEVICE FOR MAIL OR THE LIKE

Application filed April 20, 1931. Serial No. 531,288.

The present invention relates broadly to salvaging devices and is particularly directed for use in the transportation of different commodities by means of seagoing vessels, aircraft or other forms of transporting vehicles.

The primary object of the invention resides in the provision of a salvaging device for commodity receiving containers which device may be readily installed for use in a transporting vehicle and wherein provision is made for retaining the containers and to protect and make possible their release and recovery in the event of accident or mishap as, for example, the sinking of the vehicle in a body of water. In its more specific aspect the invention is directed to a salvaging device for mail bags and designed particularly for the transportation of mail by seagoing vessels, although it will be understood that the device may also be adapted for use in connection with aircraft with like facility should such aircraft fall in a body of water.

The device has been designed further for adaptation to a mail bag of the type patented by us on January 28, 1930, which bag is provided with a buoyant float or vessel of such capacity as to effect the buoyant support of the mail bag in a body of water. The purpose of the float member is, of course, to permit the mail bag to support itself on the surface of the water and to facilitate the recovery thereof and its contents.

It is also an object of the invention to form the device so that a plurality of mail bags of this kind may be stored in a compartment formed in a transporting vessel or vehicle and to provide means whereby said bags can be released and freed to float to the surface of the water in case of a disaster occurring to the vehicle during its passage from one place to another.

Another object of the invention resides in a salvaging device of this character including a compartment formed in the transporting vehicle for the storage of mail bags or other shipping containers and wherein the compartment has its side walls insulated for protection against fire and its top wall removable and made buoyant so that in case the vessel sinks said top may rise to the surface opening the compartment so that said mail bags or containers may be free to float to the surface where they may be retrieved.

A still further object is to provide buoyant float members within the compartment which normally serve to lock the buoyant lid or top in place but which upon the presence of the water sufficient to raise the float members, will move to effect the release of the top.

A still further object is to provide means in connection with this buoyant top for confining the bags or containers under the top after the same have been released from the vessel or vehicle.

A still further object is to provide indicia on the top of the lid designating the contents of the bags or containers so that the same may be readily observed by a passing vessel or airplane and to provide means on said lid whereby the same may be readily hoisted on a passing vessel or towed to the shore.

For a further understanding of the design, construction and operation and other objects and advantages, reference is to be had to the following description, the appended claims and the accompanying drawings, wherein:

Figure 1 is a view disclosing a portion of a steamship having installed on its fore deck the salvaging device comprising the present invention, Figure 2 is a vertical transverse sectional view taken on the line 2—2 of Figure 1, Figure 3 is a vertical sectional view taken on the line 3—3 of Figure 2, Figure 4 is a similar view taken on the line 4—4 of Figure 2, Figure 5 is a horizontal sectional view taken on the line 5—5 of Figure 2, Figure 6 is a vertical sectional view showing a slightly modified form of the invention.

Referring more particularly to the drawings, the numeral 1 designates the salvaging device in its entirety which is formed broadly in the shape of a housing or cabin preferably anchored or secured to the deck 2 of a steam or other propelled vessel 3. The housing or cabin, which is adapted for the storage of mail bags or other containers, is formed to include side and end walls 4 and 5 provided with a door opening 6 affording entrance to the compartment 7 or the interior of the cabin. The walls 4 and 5 are of a double construction and are insulated as at 8 for protection against fire or abnormal atmospheric temperatures, the upper edges of the walls being bevelled as at 9 and received within similar shaped grooves 10 formed in the lid or top 11 closing the upper end of the compartment 7. The beads and grooves 9 and 10 serve as a joint between the lid and side walls of the compartment and prevent lateral shifting of the lid with respect to said walls. The lid 11 is of a double wall construction and made air-tight, the purpose of which will appear later.

To hold the lid 11 in a locked position relative to the walls 4 and 5, the lower wall 12 of the lid has secured thereto at the ends thereof, brackets 13 for the rotatable support of a pair of horizontally and longitudinally arranged shafts 14 and 15. Attached for rotation with the shafts and located near the ends thereof are arms 16 which have their upper ends pivotally connected to rods 17 which in turn are connected for pivotal movement with plunger members 18 slidably received within bearings 19 provided upon the under surface of the wall 12. The outer ends of the plungers 18 are received within sockets 20 formed with the side walls 4 of the compartment 7. The plungers 18 are normally retained within the sockets 20 by means of hollow float members 21 which are positioned exterior of the shafts 14 and 15 and carried by the outer ends of arms 22 secured to said shafts by collars 23. Due to the weight of the members 21 the shafts will tend to rock in an outward direction and effect outward movement of the rods and plungers 17 and 18 and consequently hold the outer ends of the plungers within their cooperative sockets. However, by upward movement of the float members 21 the shafts will rock in an inward direction withdrawing the plungers 18 from the sockets 21 as will be obvious. To effect the simultaneous operation or withdrawal of the plungers 18 from their respective sockets, the shafts 14 and 15 are coupled together by means of arms 24 which are joined at their outer ends by a link 25. By connecting the shafts in this manner the upward movement of either of the float members 21 will unlock all of the plungers at the same time.

Arranged at the lower portion of the compartment 7 is a platform 26 which is spaced from the deck 2 or the bottom of the compartment to hold the mail bags or other containers 27 indicated by dotted lines in an elevated position above the bottom. The space between the platform 26 and the bottom of the compartment is open at its sides to permit water flowing over the deck caused by waves passing through the ports 28 formed in the lower edges of the side walls 4, to pass freely from one side to the other of the compartment.

From the foregoing it will be seen that should the water within the compartment rise to a point filling the latter, which may be caused by the sinking of the vessel, the floats 21 will rise to an elevated position and through the provision of the shafts 13 and 14 and associated parts, the plunger elements 18 will be withdrawn from their cooperative sockets 21 releasing the lid 11 from engagement with the walls of the compartment. This lid 11, which is hollow and air-tight, will form a float which will rise to the surface of the water. This opening of the upper end of the compartment 7 will free the contents thereof and if the latter is of a flotable nature, as for example the mail bag illustrated and set forth in our prior patent mentioned above in this case, the same will be free to rise to the surface of the water where said bags may be recovered. To prevent separation of the bags and to confine the same under the lid 11 during the rise of the same to the surface and while in a floating position, a screen wall 29 is provided around the bags which is carried by the lid 11 and which is of such height as to extend below the bags when the same are in a floating position on top of the water. The height of the screen wall is sufficient to permit a rocking movement of the lid 11 imparted by the waves and yet retain the mail bags or other containers within the confines of the wall. Where the bags or containers are of a floatable nature this screen wall may be open at its lower end. However, as illustrated in Figure 6 the screen wall 29' is closed at its lower end so that when containers or bags which do not float independently are used, they will be confined within the screen inclosure and raised together with the lid to the surface. The lid 11 is, of course, of sufficient size and capacity as to effect the support of the bags or containers in this latter case.

In this modified form of the invention the float members 21' instead of being carried by the outer ends of the arms 22 are positioned at the lower end of the compartment 7 and are attached to the lower ends of rods 30 slidably positioned for vertical movement within spaced bearings 31 carried by the screen wall 29'. The upper end of the rods 30 engage arms 32 attached to the plunger operating shafts. This positioning of the float members 21' will effect an earlier release of the lid 11 than by the floats 21 shown in the preferred form.

The lid 11, which is of considerable size, may have the upper surface of its arcuate wall provided with indicia provided with letters such as the word "Mail" or the like so that a ship or aircraft passing by may readily ascertain the contents of the floating object. The lid 11 may further be provided with pivcted rings or the like 33 by which the lid may be hoisted on top of the steamer or be towed to a convenient point.

The cabin or mail room although shown positioned on top of the deck may, of course, be arranged below the latter with the lid thereof in a plane substantially even with the deck or the same may be formed as a part of the upper structure of the vessel. In any case it should be so located that the lid when released, will be free to float to the surface without hindrance. It will also be understood that the mail room may be built as part of the fuselage of an airplane or in connection with a dirigible and operated in the same manner should the airplane or dirigible have a disaster while passing over a body of water.

To protect the float operating mechanism and to prevent interference thereof with the bags during the release of the lid, said mechanism may be inclosed by a screen housing 33' and to allow the escape of air confined above the water during its rise within the compartment, vent openings 34 are formed at the upper ends of the walls. The ports 28 may be provided with louvers 35 which will prevent dust or other foreign matter from blowing directly into the compartment. The louvers also aid in checking the force of the water in cases where waves are passing across the deck of the vessel.

From the foregoing it will be seen that a salvaging device has been provided for mail or other valuables which device may be readily installed on a transporting vehicle such as a steamship or the like and wherein provision is made for protecting the mail or valuables from fire during the transportation and which device also permits the release of such valuables from the vehicle when a disaster occurs, such as the sinking of the vessel, allowing the valuables to float to the surface where they may be retrieved. The device is extremely simple in construction, reliable in operation and may be readily installed at a comparatively low cost.

What is claimed is:

1. A device of the character described comprising a compartment adapted for the storage of mail bags and the like, said compartment being formed with openings at its lower end communicating with the exterior thereof, a buoyant lid member for said compartment, and float controlled locking means positioned within said compartment for effecting the locking and unlocking of said lid with respect to said compartment.

2. A device of the character described comprising a compartment having insulated walls adapted for the storage of commodities therein, said compartment being formed with openings in the lower portion of its walls communicating with the exterior of said compartment, a buoyant lid member closing the upper end of said compartment, locking means between said lid member and said compartment, and float means positioned within said compartment for controlling the actuation of said locking means.

3. A device of the character set forth comprising a compartment adapted for the storage of mail bags and the like, said compartment being provided with openings open to the atmosphere, a buoyant lid for said compartment, locking means between said lid and said compartment, said locking means including slidable members carried by said lid and engaging sockets formed in the walls of said compartment, and pivoted float members carried by said lid and acting to withdraw said slidable members from said sockets upon the rise of the float members effected by the presence of water in said compartment.

4. A device of the character set forth comprising a compartment adapted for the storage of mail bags and the like, ports leading into the bottom of said compartment, a buoyant lid for said compartment, float controlled locking means positioned within said compartment for retaining the lid in connection with said compartment, and a perforated wall carried by said lid and lying adjacent the wall surfaces of said compartment.

5. A device of the character described comprising a compartment of sufficient size to accommodate a plurality of mail bags or the like, an entrance opening for said compartment, a buoyant lid member disposed in the upper end of said compartment, float controlled locking means for said lid positioned within said compartment, and a screen carried by said lid and enclosing the bags within said compartment.

6. A device of the character set forth comprising a compartment adapted for the storage of mail bags and the like, said compartment being provided with openings and having its lower end open to the atmosphere, a buoyant lid closing the upper end of said compartment, slidable locking members carried by said lid and engaging the walls of said compartment, a float member for each of said slidable locking members, and connections between said float members and locking members for effecting the simultaneous action of all the locking members by any one of the float members.

In testimony whereof we affix our signatures.

MICHAEL VUKOVICH.
WILLIAM E. BERRY.